United States Patent
Huang

(10) Patent No.: US 8,928,754 B2
(45) Date of Patent: Jan. 6, 2015

(54) SECURITY SYSTEM AND METHOD

(75) Inventor: Jyun-Hao Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 671 days.

(21) Appl. No.: 13/249,264

(22) Filed: Sep. 30, 2011

(65) Prior Publication Data

US 2012/0229630 A1     Sep. 13, 2012

(30) Foreign Application Priority Data

Mar. 10, 2011   (TW) .................................. 100108028

(51) Int. Cl.
*H04N 7/18*   (2006.01)
*G06T 7/20*   (2006.01)
*G08B 13/196*   (2006.01)

(52) U.S. Cl.
CPC ..... *G06T 7/2053* (2013.01); *G06T 2207/30232* (2013.01); *G08B 13/19604* (2013.01); *G08B 13/19602* (2013.01)
USPC ............ 348/154; 348/143; 348/149; 348/155

(58) Field of Classification Search
CPC .................. H04N 5/144; G06T 7/2053; G06T 2207/30232; G06T 2207/30241; G06T 7/20; G08B 13/19663; G08B 13/19602; G08B 13/19604
USPC .................... 348/143, 149, 155, 571, E7.085, 348/E5.065; 382/107, 103
See application file for complete search history.

(56) References Cited

U.S. PATENT DOCUMENTS 6,493,041 B1 *  12/2002  Hanko et al. ................... 348/699
2003/0165193 A1 *  9/2003  Chen et al. ............... 375/240.08

* cited by examiner

*Primary Examiner* — Sath V Perungavoor
*Assistant Examiner* — Nathnael Aynalem
(74) *Attorney, Agent, or Firm* — Novak Druce Connolly Bove + Quigg LLP

(57) ABSTRACT

A computing system displays current real-time images of an area monitored by a camera. The computing system includes a motion detection unit. The motion detection unit determines a number of varied pixels in the real-time image compared with a previous image, and to determine a ratio of pixels of the number of the varied pixels to a total number of pixels in the real-time image. If the ratio is greater than a predefined number, the computing system increments an abnormal pixel count by one. If the abnormal pixel count is greater than a maximum abnormal pixel number, the computing system starts an alarm device connected to the computing system.

10 Claims, 3 Drawing Sheets

SECURITY SYSTEM AND METHOD

BACKGROUND

1. Technical Field

Embodiments of the present disclosure generally relate to surveillance systems, and particularly to a system and method for video surveillance.

2. Description of Related Art

Cameras are often used to monitor a designated area. Stationary objects in the designated area captured by the camera may be regarded as a background model of a real-time image captured by the camera. If the camera is damaged, the background model of the camera may be changed, and the area cannot be monitored normally.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
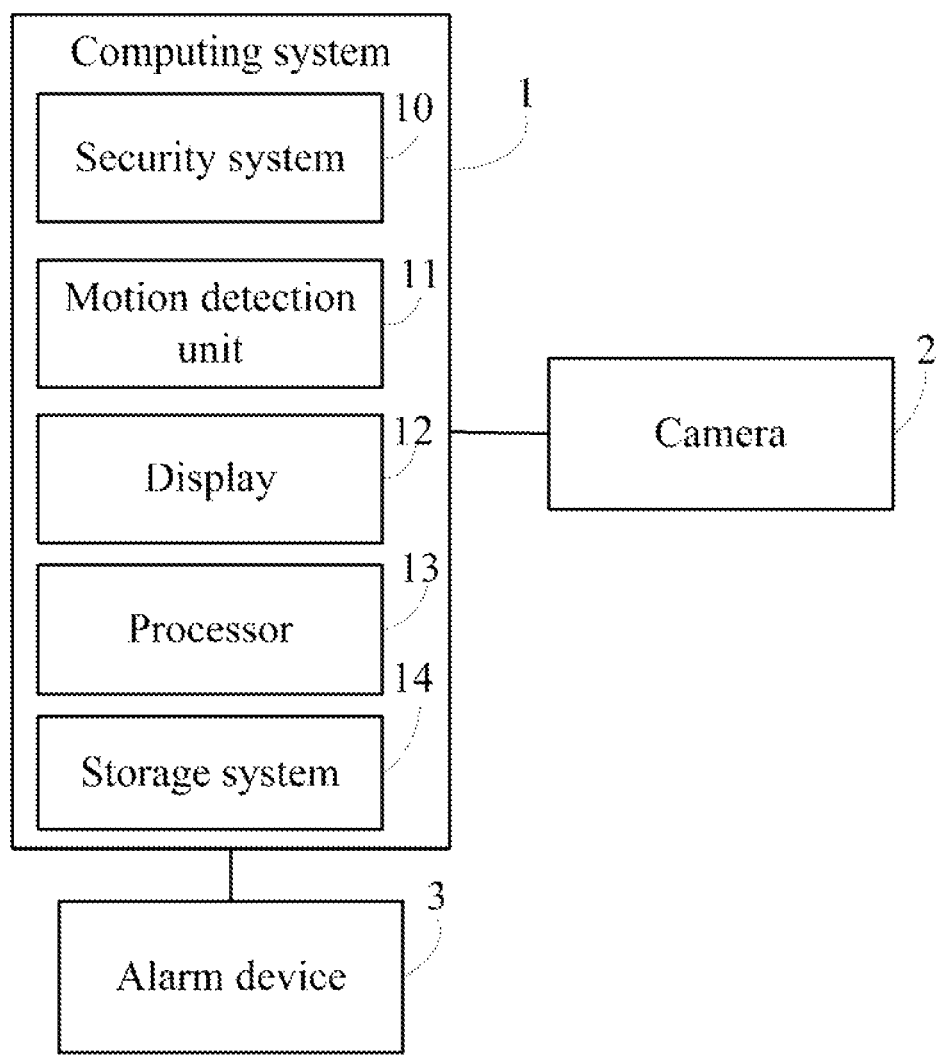
FIG. 1 is a block diagram of one embodiment of a computing system comprising a security system.

FIG. 1 is a block diagram of one embodiment of a computing system 1 comprising a security system 10. The computing system 1 is electronically connected to a camera 2 and an alarm device 3. In some embodiments, the alarm device 3 may be included within the computing system 1. The camera 2 may be a monochromatic stationary video camera, or an infrared camera. The camera 2 captures a real-time image of an area and sends the real-time image to the computing system 1. The computing system 1 includes a motion detection unit 11 and a display 12. The computing system 1 displays the real-time image on the display 12. The security system 10 analyzes the real-time image to find any changes from a previous image of the same view according to the different pixels. If there are any changes, the security system 10 activates the alarm device 3.

In an exemplary embodiment, the computing system 1 further includes at least one processor 13 and a storage system 14. The security system 10 may include one or more modules. The one or more modules may comprise computerized code in the form of one or more programs that are stored in the storage system 14 (or memory). The computerized code includes instructions that are executed by the at least one processor 13 to provide functions for the one or more modules. The motion detection unit 11 is a software module which comprises computerized instructions that are executed by the at least one processor 13.

Figure 2:
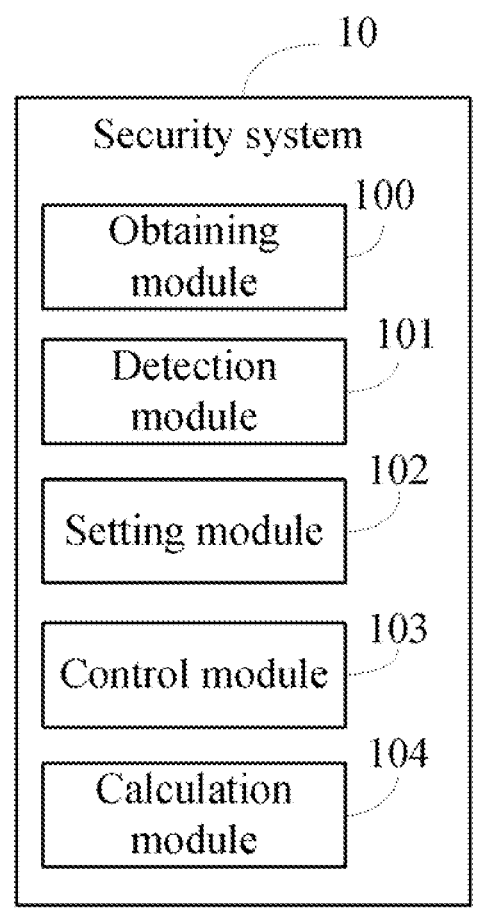
FIG. 2 is a block diagram of one embodiment of the function modules of the security system in FIG. 1.

As shown in FIG. 2, the security system 10 may include an obtaining module 100, a detection module 101, a setting module 102, a control module 103, and a calculation module 104.

The obtaining module 100 reads a current real-time image captured by the camera 2. According to the real-time image, a background modeling method, such as Gaussian Mixtures, can be used to determine a background model and moving objects captured in the current real-time image. The moving objects may include people and/or cars.

The detection module 101 detects if the camera 2 is in an alert status. The alert status is a condition in which a comparison of the current real-time image and a previous real-time image indicated the possibility of movement is in an area of interest. In one embodiment, if a flag in a processor of the security system 10 is set to "1", the camera 2 is in the alert status. If the flag is set to "0", the camera 2 is in a normal status.

If the camera 2 is in the normal status, the setting module 102 continually updates the background model of the real-time image by using a updating background model method. The background model is areas of the real-time image in which objects are static (i.e., not moving, stationary). In one embodiment, the updating background model method may be the Gaussian Mixture updating algorithm. For example, if the camera 2 is in the alert status, the control module 103 controls the motion detection unit 11 to determine a number of varied pixels in the real-time image compared with a previous image, and determine a ratio of the number of the varied pixels to a total number of pixels in the real-time image. It is noted that, if a pixel value of one selected pixel (such as pixel A) in the real-time image is different from a pixel value in a corresponding pixel (such as pixel A') of the previous image, the selected pixel is determined as a varied pixel. A location of the selected pixel in the real-time image is the same as a location of the corresponding pixel in the previous image. For example, if the ratio is 0.7, that means 70% pixels of the real-time image are varied compared with the previous image.

The detection module 101 detects if the ratio is greater than a predefined value. If the ratio is greater than the predefined value, the real-time image of the area is determined as changed, and the setting module 102 puts the camera 2 in the alert status. The calculation module 104 increments an abnormal image count by one. The abnormal image count indicates how many images of the area have changed. In one embodiment, an initial value of the abnormal image count is 0. The detection module 101 detects if the abnormal image count is greater than a first predefined maximum number. If the abnormal image count is greater than the first predefined maximum number, the control module 103 activates the alarm device 3 to inform a user to check the area. If the abnormal image count is not greater than the first predefined maximum number, the obtaining module 100 reads a next image.

If the ratio is not greater than the predefined value, the detection module 101 detects if the camera 2 is in the alert status. If the camera 2 is in the alert status, the calculation module 104 increments the normal image count by one. The normal image count indicates how many images of the area have not changed. In one embodiment, an initial value of the normal pixel count is 0. The detection module 101 detects if the normal image count is greater than a second predefined maximum number. If the normal image count is greater than the second predefined maximum number, the setting module 102 resets the normal image count and the abnormal image count to be the corresponding initial value and switches the camera 2 from the alert status to the normal status.

Figure 3:
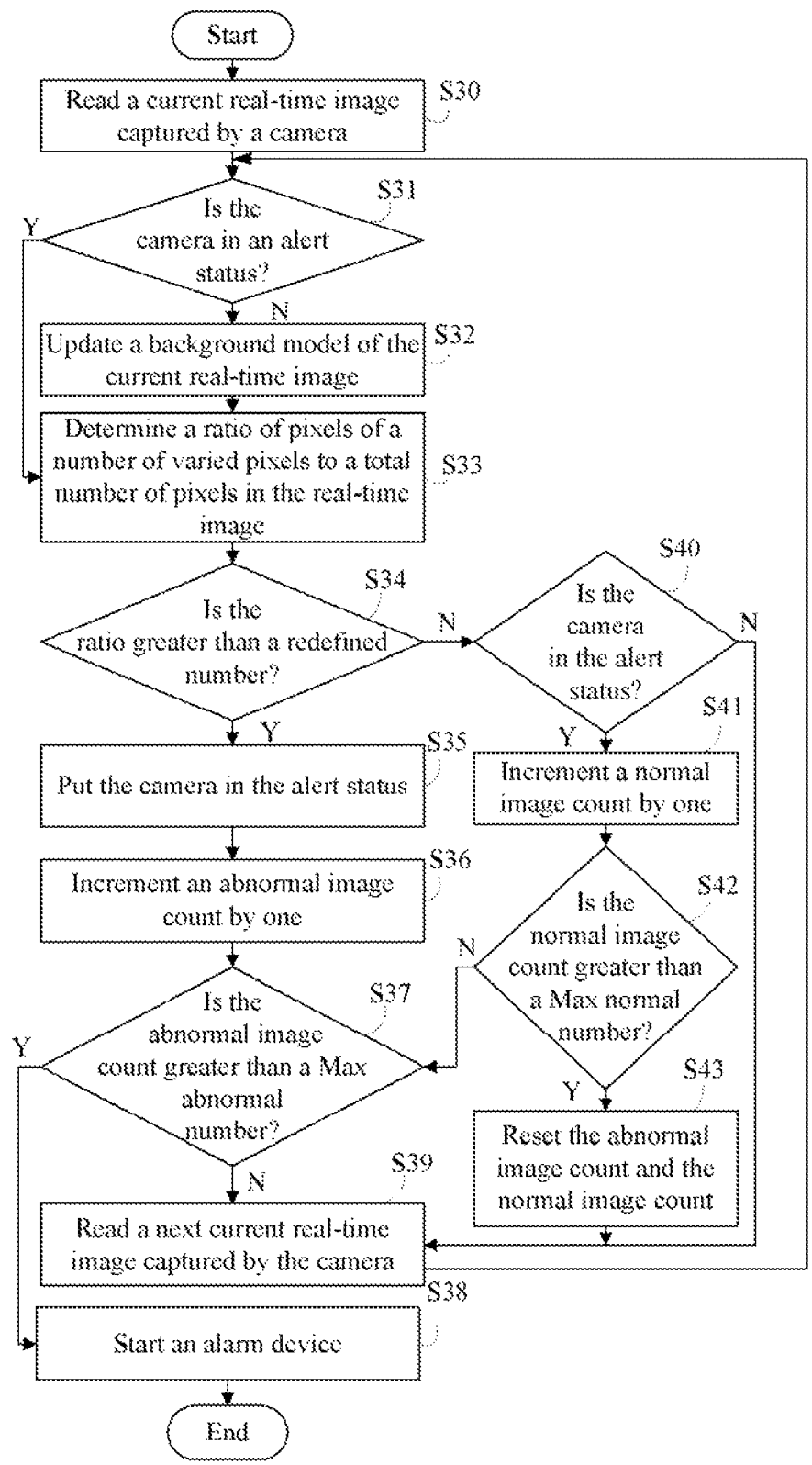
FIG. 3 is a flowchart illustrating one embodiment of a method for detecting monitor images.

FIG. 3 is a flowchart illustrating a method for detecting monitor images. Depending on the embodiment, additional blocks may be added, others removed, and the ordering of the blocks may be changed.

In block S30, the obtaining module 100 reads a current real-time image captured by the camera 2.

In block S31, the detection module 101 detects if the camera 2 is in an alert status according to a status value. If the camera 2 is not in the alert status, block S32 is implemented. If the camera 2 is in the alert status, block S33 is implemented.

In block S32, the setting module 102 updates a background model of the real-time image by using a updating background model method.

In block S33, the control module 103 controls the motion detection unit 11 to determine a number of varied pixels in the current real-time image compared with a previous image, and determine a ratio of the number of the varied pixels to a total number of pixels in the current real-time image.

In block S34, the detection module 101 detects if the ratio is greater than a predefined value. If the ratio is greater than the predefined value, block S35 is implemented. If the ratio is not greater than the predefined value, block S40 is implemented.

In block S35, the setting module 102 puts the camera 2 in the alert status. If camera 2 is determined in the alert status in block S31, block S35 can be omitted and block S36 is implemented directly.

In block S36, the calculation module 104 increments the abnormal image count by one.

In block S37, the detection module 101 detects if the abnormal image count is greater than a maximum abnormal number. If the abnormal image count is greater than the maximum abnormal number, block S38 is implemented. If the abnormal image count is not greater than the maximum abnormal number, block S39 is implemented.

In block S38, the control module 103 starts the alarm device 3 to inform a user to check the area and procedure ends.

In block S39, the obtaining module 100 reads a next image captured by the camera 2 and block S31 is repeated.

In block S40, the detection module 101 detects if the camera 2 is in the alert status. If the camera 2 is in the alert status, block S41 is implemented. If the camera 2 is not in the alert status, block S39 is repeated.

In block S41, the calculation module 104 increments the normal image count by one.

In block S42, the detection module 101 detects if the normal image count is greater than a maximum normal number. If the normal image count is greater than the maximum normal number, block S43 is implemented. If the normal image count is not greater than the maximum normal number, block S37 is repeated.

In block S43, the setting module 102 resets the normal image count and the abnormal image count, switches the camera 2 from the alert status to the normal status, and repeats block S39.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A computing system, comprising:
   a storage system;
   at least one processor; and
   one or more programs being stored in the storage system and executable by the at least one processor, the one or more programs comprising:
   an obtaining module operable to read a current real-time image of an area captured by a camera;
   a control module operable to control a motion detection unit of the computing system to determine a number of varied pixels in the current real-time image compared with a previous image of the area, and determine a ratio of pixels of the number of the varied pixels to a total number of pixels in the current real-time image;
   a setting module operable to put the camera in an alert status if the ratio is greater than a predefined value;
   a calculation module operable to increment an abnormal image count by one;
   the obtaining module further operable to read a next image captured by the camera if the abnormal image count is not greater than a maximum abnormal number; and
   the control module further operable to start an alarm device connected to the computing system if the abnormal image count is greater than the maximum abnormal number.

2. The computing system as described in claim 1, further comprising:
   a detection module operable to detect if the camera is in the alert status if the current real-time image is read by the computing system; and
   the setting module operable to update a background model of the current real-time image by using an updating background model method if the security system is in a normal status.

3. The computing system as described in claim 1, wherein the calculation module is further operable to increment a normal image count by one if the ratio is not greater than the predefined value and the security system is in the alert status.

4. The computing system as described in claim 3, wherein the setting module is further operable to reset the normal image count and the abnormal image count and switch the camera from the alert status to the normal status if the normal image count is greater than a maximum normal number.

5. A computer-based method for detecting monitor images, comprising:
   reading a current real-time image of an area captured by a camera;
   controlling a motion detection unit of a computing system connected to the camera to determine a number of varied pixels in the current real-time image compared with a previous image of the area, and to determine a ratio of pixels of the number of the varied pixels to a total number of pixels in the current real-time image;
   putting the camera in an alert status if the ratio is greater than a predefined value;
   incrementing an abnormal image count by one;
   detecting if the abnormal image count is greater than a maximum abnormal number;
   reading a next current image captured by the camera if the abnormal image count is not greater than a maximum abnormal number; and
   starting an alarm device connected to the computing system if the abnormal image count is greater than the maximum abnormal number.

6. The method as described in claim 5, after block reading a real-time image monitored by a camera further comprising:
   detecting if the security system is in the alert status; and updating a background model of the current real-time image by using a updating background model method if the camera is in a normal status.

7. The method as described in claim 5, further comprising:
incrementing a normal image count by one if the ratio is not greater than the predefined value and the camera is in the alert status;
detecting if the normal image count is greater than a maximum normal number;
resetting the normal image count and the abnormal image count, and switching the camera from the alert status to the normal status if the normal image count is greater than the maximum normal number; and
implementing block detecting if the abnormal image count is greater than a maximum abnormal number.

8. A non-transitory storage medium having stored thereon instructions that, when executed by a processor, cause the processor to perform a method for detecting monitor images, the method comprising:
reading a current real-time image of an area captured by a camera;
controlling a motion detection unit of a computing system connected to the camera to determine a number of varied pixels in the current real-time image compared with a previous image of the area, and to determine a ratio of pixels of the number of the varied pixels to a total number of pixels in the current real-time image;
putting the camera in an alert status if the ratio is greater than a predefined value;
incrementing an abnormal image count by one;
detecting if the abnormal image count is greater than a maximum abnormal number;
reading a next current image captured by the camera if the abnormal image count is not greater than a maximum abnormal number; and
starting an alarm device connected to the computing system if the abnormal image count is greater than the maximum abnormal number.

9. The non-transitory storage medium as described in claim 8, after block reading a real-time image captured by a camera further comprising:
detecting if the security system is in the alert status; and
updating a background model of the current real-time image by using a updating background model method if the camera is in a normal status.

10. The non-transitory storage medium as described in claim 8, further comprising:
incrementing a normal image count by one if the ratio is not greater than the predefined value and the camera is in the alert status;
detecting if the normal image count is greater than a maximum normal number;
resetting the normal image count and the abnormal image count, and switching the camera from the alert status to the normal status if the normal image count is greater than the maximum normal number; and
implementing block detecting if the abnormal image count is greater than a maximum abnormal number.

* * * * *